United States Patent
Csoppenszky et al.

[11] Patent Number: 5,987,081
[45] Date of Patent: Nov. 16, 1999

[54] METHOD AND APPARATUS FOR A TESTABLE HIGH FREQUENCY SYNCHRONIZER

[75] Inventors: Michael A. Csoppenszky, Los Gates; Kevin B. Normoyle, Santa Clara; Prakash Narain, San Carlos, all of Calif.

[73] Assignee: Sun Microsystems, Inc., Palo Alto, Calif.

[21] Appl. No.: 08/884,253

[22] Filed: Jun. 27, 1997

[51] Int. Cl.$^6$ .................................................. H04L 7/00
[52] U.S. Cl. .............................. 375/354; 326/93; 327/142; 327/145; 713/400
[58] Field of Search ............................ 375/354, 355, 375/357, 356, 371; 326/93, 94; 327/141, 142, 144, 145, 146, 153, 155, 161; 713/400, 401, 500, 501, 503

[56] References Cited

U.S. PATENT DOCUMENTS

| | | | |
|---|---|---|---|
| 4,873,703 | 10/1989 | Crandall et al. | 375/371 |
| 5,101,419 | 3/1992 | Lowe et al. | 375/354 |
| 5,122,694 | 6/1992 | Bradford et al. | 327/142 |
| 5,487,092 | 1/1996 | Finney et al. | 375/354 |
| 5,504,927 | 4/1996 | Okamoto et al. | 395/878 |

OTHER PUBLICATIONS

Kleeman, Lindsay: The Jitter Model for Metastability and its Application to Redundant Synchronizers 1990 pp. 930–942.

Kleeman, Lindsay and Cantoni, Antonio: Metastable Behavior in Digital Systems 1987 pp. 4–19.

*Primary Examiner*—Young T. Tse
*Attorney, Agent, or Firm*—Pennie & Edmonds LLP

[57] ABSTRACT

A synchronizer comprised in part of a series of flip-flops is used to deterministically transfer data between clock domains during system test. Flip-flops in the clock domain operating at a higher clock frequency have a clock enable signal. The clock enable signal is defined so as to approximately align the enabled rising clock edges of the faster clock signal with the falling edges of the slower clock signal. This approximate alignment provides a timing window of one half period of the slower clock for the data to stabilize at the input of a flip-flop in the faster clock domain before it is sampled. This ensures deterministic transfer of data. Data flow control circuitry can be used to provide a ready signal to the faster clock domain to indicate that the synchronizer is available to transfer a synchronization signal. After testing is complete, the synchronizer can operate in an application mode wherein one or more of the clock enable signals is set to a continuous high level to minimize latency.

19 Claims, 7 Drawing Sheets

METHOD AND APPARATUS FOR A TESTABLE HIGH FREQUENCY SYNCHRONIZER

The present invention relates generally to digital systems having more than one clock domain, and more particularly to an interface for deterministically transferring data across an asynchronous boundary.

BACKGROUND OF THE INVENTION

Synchronizers are used to interface two digital components that are operating from unrelated clock signals. Because the clock signals are unrelated, data transferred from one component to the other is asynchronous. An asynchronous input introduces the potential for metastability failures. In contrast to asynchronous inputs, synchronous inputs to a system obey strict timing relations governed by a reference such as a system clock. For example, a synchronous input to a flip-flop changes only within a predetermined part of the system clock period. The predetermined timing window for the change in the input is defined to ensure that the setup and hold time requirements of the flip-flop are satisfied. The setup time defines the amount of time that a data input must be available and stable before an active clock edge. The hold time describes the length of time that the data to be clocked into the flip-flop must remain available and stable after an active clock edge. Because there is no fixed relationship between an asynchronous input and the clock signal the asynchronous input may violate either a set-up or hold time requirement. When these timing requirements are violated it can put the circuit into a metastable state which is where the circuit may linger or oscillate indefinitely between two stable states. Failures resulting from metastable behavior are particularly troublesome and mysterious because they are intermittent, random, and virtually untraceable.

A well known approach to transferring data between two asynchronous components is to use an interface that converts the asynchronous inputs to synchronous inputs by sampling the inputs using the system clock. This sampling process is called synchronization and the interface is known as a synchronizer. The inherent unpredictability of the timing relationship between an asynchronous input and a clock signal has made metastability a significant recurrent problem in digital systems.

A conventional synchronizer is illustrated in FIG. 1. Clock domain A 110 and clock domain B 116 have independent clocks. Data transferred from clock domain A is therefore an asynchronous input to clock domain B. Flip-flop 112 and flip-flop 114 form a synchronizer 118. Both of the flip-flops are driven by a clock signal from the clock B domain. The flip-flops provide a one clock period delay during which a marginal input value has the opportunity to resolve to either valid logic value as it is shifted through the synchronizer flip-flops. However, a primary problem of the conventional synchronizer is that there remains a significant probability that the input at flip-flop 112 will violate the flip-flop 112 set-up time placing flip-flop 112 into an indeterminate state that can cause the signal to fail to be passed on to flip-flop 114.

In a test environment, the clock domain A 110 clock signal and the clock domain B 116 signal may be derived from a single clock in the test system. A conventional approach to transferring data across an asynchronous boundary in a test environment is to skew the clocks to minimize the likelihood of a data input violating the set-up time of a receiving device. In a high frequency test environment the uncertainty in the timing relationship between the two clock signals may approach the clock period of the faster clock signal. When this occurs skewing the clocks is no longer sufficient to deterministically transfer data across the asynchronous boundary. Other synchronizers have attempted to use clock enable signals to avoid metastable states.

Computer systems can be designed to tolerate certain types of uncertainty in asynchronous interfaces. For example, data transfer between a CPU and a system bus may be asynchronous. The transfer of data between the CPU and the bus may be delayed by one or more cycles due to the asynchronous interface. The system can be designed to tolerate such variations in order to maximize the overall system operating speed. However, in a test environment, a test machine provides an input pattern to a device and checks to see if a specific output pattern is provided. If data is delayed non-deterministically at an asynchronous interface, the test system interprets the delay as a malfunction in the part because the output does not match the predefined output pattern at a specific point in time. Therefore, systems that may tolerate asynchronous variations in actual operation still must conform to deterministic operation in the test environment. In conventional systems, devices often fail high frequency testing because of a delay introduced in an asynchronous data transfer, when in fact the devices would be completely functional when run in the application system because the system is designed to accommodate non-deterministic delays in data transfer. As a result perfectly functional devices are discarded or are sold for application at a lower frequency than they actually could be operated at.

In view of these and other problems of conventional synchronizers, a synchronizer that provides deterministic data transfer across an asynchronous boundary in a test environment and allows for high speed performance in an application environment would be highly desirable.

SUMMARY OF THE INVENTION

The present invention is a method and apparatus for deterministically transferring data across an asynchronous boundary in a test environment. In one embodiment of the present invention, a synchronizer comprised in part of a series of flip-flops is used to deterministically transfer data from one clock domain to a second clock domain operating at a higher frequency. Flip-flops in the clock domain operating at a higher clock frequency have a clock enable signal. In the test environment the clock signals for both clock domains are derived from the same clock. However, differences in the-clock distribution delays can lead to timing problems during test. The clock enable signal is defined so as to approximately align the enabled rising clock edges of the faster clock signal with the falling edges of the slower clock signal. This approximate alignment provides a timing window of one half period of the slower clock for the data to stabilize at the input of a flip-flop in the faster clock domain before it is sampled. This ensures deterministic transfer of data.

To deterministically transfer data from one clock domain to a second clock domain operating at a lower frequency according to another embodiment of the present invention a bidirectional synchronizer is used. An embodiment of the bidirectional synchronizer comprises in part a series of flip-flops to transfer data to the slower clock domain and data flow control circuitry to provide a ready signal to the faster clock domain to indicate that the synchronizer is available to transfer a synchronization signal. The ready signal ensures that the faster clock domain does not send data to the slower clock domain faster than it can be received. The ready signal is transferred from the slower clock domain to the faster clock domain. The synchronizer thus has one asynchronous transfer from the faster clock domain to the slower clock domain for the synchronization signal, and a second asynchronous transfer in the opposite direction for the ready signal. The deterministic transfer of signals across both of these asynchronous boundaries is ensured in the test environment by the above described technique of using clock enable signals to align the enabled rising edges of the faster clock signal with the falling edges of the slower clock signal. The synchronizer may be one component of a large integrated circuit device such as a CPU. Where the device is designed to tolerate non-deterministic delays in the transfer of data across an asynchronous boundary, in the end product the synchronizer can operate in an application mode wherein one or more of the clock enable signals is set to a continuous high level to minimize latency.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Figure 1:
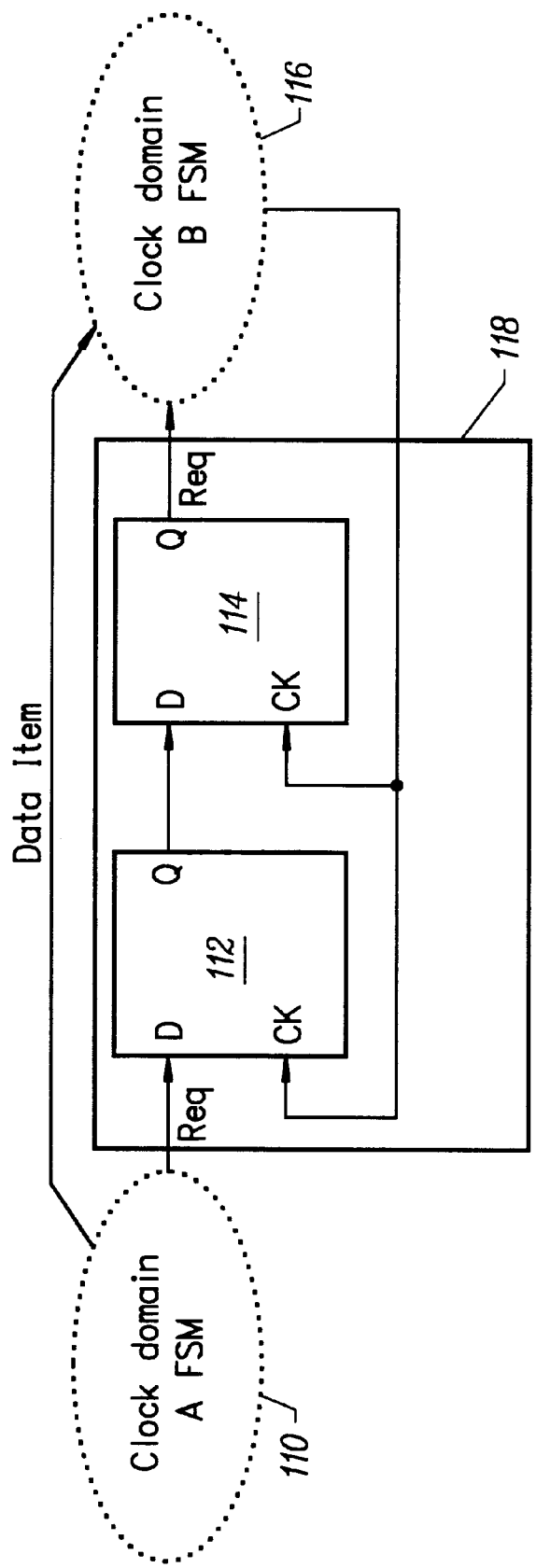
FIG. 1 illustrates a prior art synchronizer.
Figure 2:
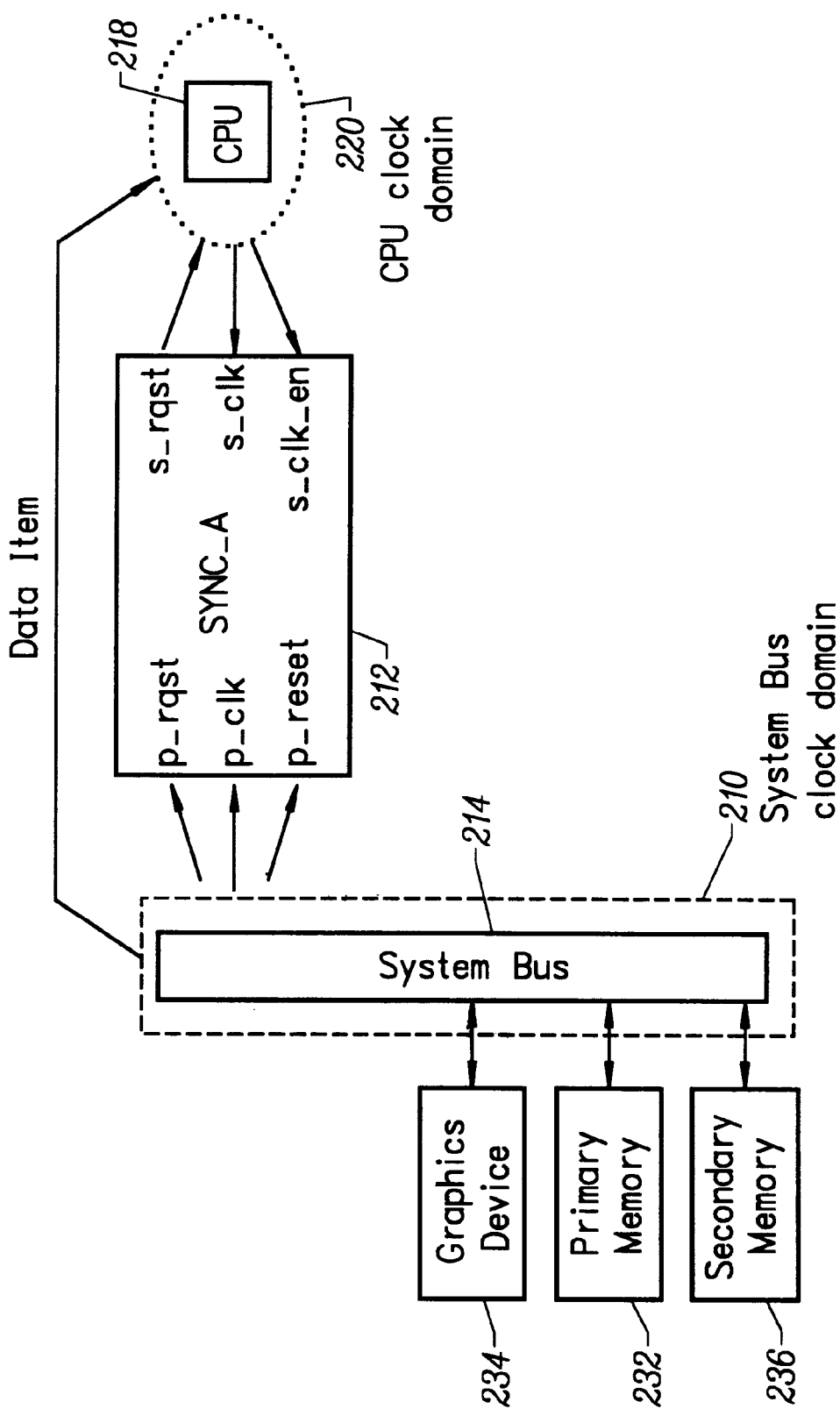
FIG. 2 illustrates a block diagram of a computer system including a synchronizer for transferring data to a clock domain operating at a higher clock frequency according one embodiment of the present invention.

FIG. 2 illustrates a block diagram of a computer system including a synchronizer 212 according to one embodiment of the present invention. The diagram represents a computer system in which System Bus clock domain 210 includes a computer bus 214, and CPU clock domain 220 includes a CPU 218. The computer system further includes a synchronizer SYNC_A 212, a graphics device 234, a primary memory 232 and a secondary memory 236. The synchronizer SYNC_A 212 can also be incorporated in CPU 218. The CPU clock domain typically operates at a substantially higher clock frequency than the System Bus clock domain. The reason for this is in part that the CPU clock domain may only comprise a single integrated circuit chip, Whereas the System Bus clock domain may comprise a bus connecting the CPU to main memory and peripheral storage devices. The parasitic capacitance and inductance in the single chip environment are therefore substantially lower than in the system bus environment. The lower parasitics in a single chip allow the CPU to operate at higher clock frequencies than the bus. For example, the CPU clock domain may have a clock frequency of 300 megahertz (MHz), while the System Bus clock domain clock frequency may be 33 MHz.

The System Bus clock domain and the CPU clock domain are independent and therefore asynchronous. Synchronizer SYNC_A 212 provides a unidirectional interface for the transfer of data from the lower clock frequency System Bus clock domain to the higher clock frequency CPU clock domain. The SYNC_A 212 synchronizer may be implemented with six signals. The p_rqst signal is a request by the System Bus clock domain to transfer data to the CPU clock domain. The p_clk signal is the System Bus clock domain 210 clock signal. The p_reset signal resets the synchronizer to initiate a data transfer. The s_clk signal is the CPU clock domain 220 clock signal. The s_clk_en signal is a clock enable signal, and the s_rqst signal is the synchronization signal output. The synchronizer synchronizes the p_rqst/s_rqst synchronization signal. The actual data item is transferred outside of the synchronizer as illustrated in FIG. 2.

Figure 3:
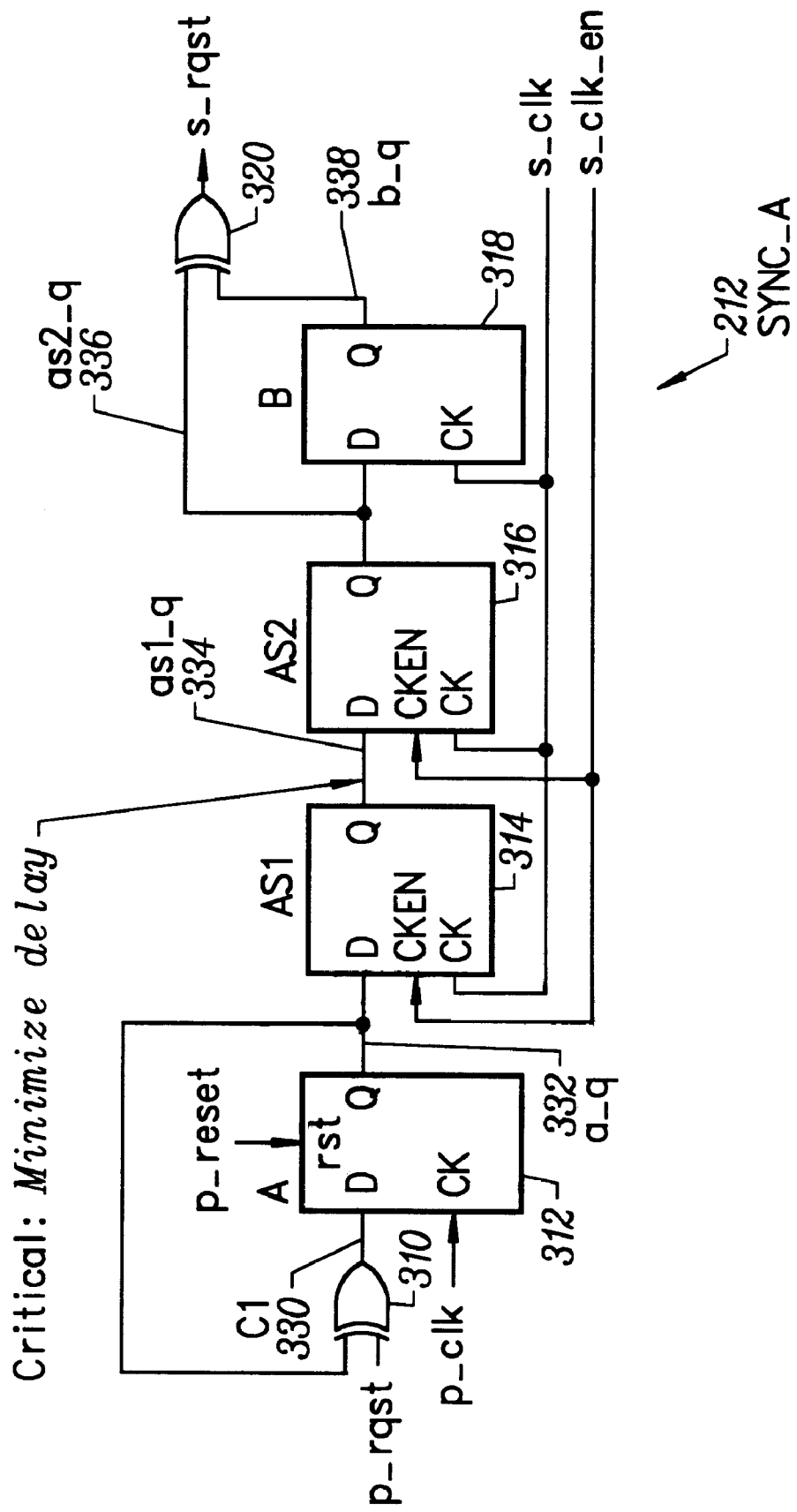
FIG. 3 illustrates a logic diagram of an embodiment of the SYNC_A synchronizer of FIG. 2.
Figure 4:
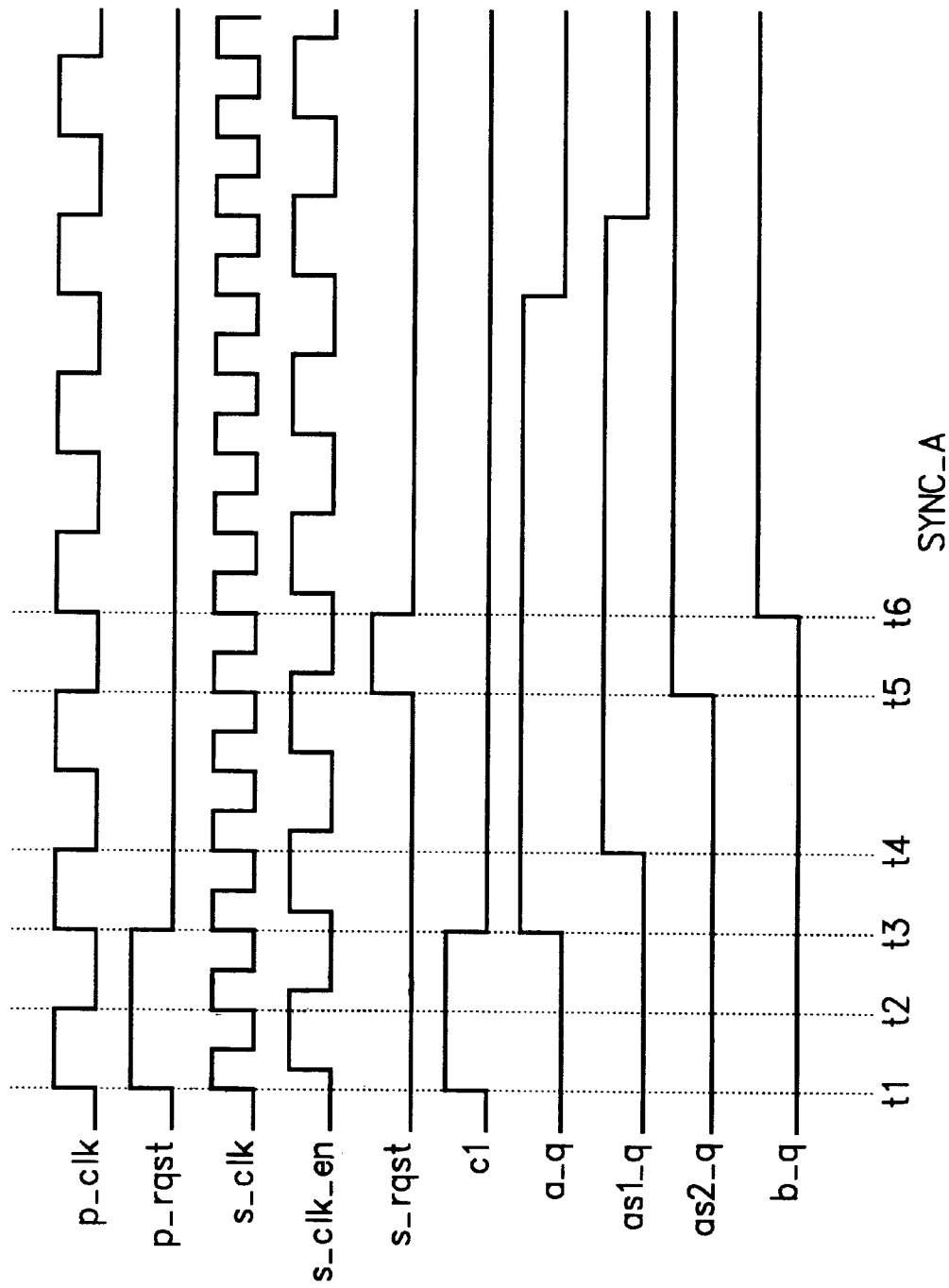
FIG. 4 illustrates a timing diagram for the SYNC_A synchronizer embodiment of FIG. 3.

FIG. 3 illustrates a logic diagram of an embodiment of the SYNC_A 212 synchronizer of FIG. 2. The SYNC_A 212 synchronizer is comprised of four flip-flops A 312, AS1 314, AS2 316 and B 318 and two XOR gates 310 and 320. Flip-flop A 312 receives the p_clk signal and is therefore synchronous with the System Bus clock domain. Flip-flops AS1 314, AS2 316 and B 318 all receive a clock signal from the CPU clock domain. The asynchronous data transfer transition is therefore from flip-flop A 312 to flip-flop AS1 314, which is labeled as node a_q 332. A timing diagram for SYNC_A 212 is illustrated in FIG. 4.

During the testing of a device incorporating the synchronizer, it is important to ensure that a rising edge of a data pulse does not reach the D input of flip-flop AS1 314 simultaneously with a rising edge of the s_clk clock signal. If this occurs flip-flop AS1 314 may sample the data signal at an unknown point on the rising edge of the data signal, this indeterminate timing relationship is called a race condition. The data may be interpreted as a 0 or a 1 depending on the point along the rising edge that is sampled. The marginal triggering of flip-flop AS1 314 may also cause the flip-flop to go into a metastable state where its output lingers or oscillates between a high and low value. It is critical to avoid this marginal timing relationship to deterministically transfer data across an asynchronous boundary during system test. If the data arriving at the data input terminal of AS1 314 was synchronous with the s_clk clock signal then the timing of the signal would be designed to satisfy the set-up and hold time requirements of the flip-flop. However, because flip-flop A 312 and flip-flop AS1 314 are controlled by different clock signals, the data passing between the two flip-flops may, absent further precautions, violate the flip-flop AS1 314 timing requirements.

To ensure that data arriving at flip-flop AS1 314 satisfies the flip-flop's timing requirements the s_clk_en signal is used. The s_clk_en signal is the clock enable signal for flip-flops AS1 314 and AS2 316. The clock enable signal at a flip-flop must be high for the flip-flop to detect a transition in the clock signal and sample data. Therefore, for the AS1 314 and AS2 316 flip-flops to sample data, the clock enable signal must be high at the time of a rising edge of the clock signal. The clock enable signal is used to approximately align the enabled rising clock signal edges with the falling edges of the p_clk signal. This ideally makes the enabled s_clk 180 degrees out of phase with the p_clk. To avoid failures due to marginal triggering it is only necessary that the s_clk and p_clk signals be aligned sufficiently that the timing requirements of the receiving flip-flop are satisfied.

The p_clk system is a rising edge triggered system. Thus control signal rising edges coincide with a rising edge of the p_clk signal. Aligning the enabled s_clk rising edges with the falling edges of the p_clk signal provides a time buffer window, one half of a p_clk period long, between the enabled s_clk rising edge and any changes in an input control signal. This alignment therefore minimizes the likelihood of a race condition. Where the uncertainty in the timing relationship between the s_clk signal and the p_clk signal can be reduced sufficiently below one half of a p_clk period, the system guarantees that there will not be a race condition at the data interface between the two clock domains.

The synchronizer SYNC_A 212 illustrated in FIG. 3 is an example of one embodiment for implementing this synchronization process. The a_q 332 node is the transition between the p_clk System Bus clock domain and the s_clk CPU clock domain. Because the p_clk and s_clk signals are asynchronous, to avoid race conditions the clock enable signal at flip-flop AS1 314 is used to align enabled s_clk signal rising edges with falling edges of the p_clk signal during system test. When the SYNC_A 212 synchronizer is used in a test environment, the p_clk and s_clk signals may originate from a common clock signal generated by a semiconductor test system. However, typically asynchronous signals are not routed in a device so as to provide an accurate timing relationship between the signals. Therefore, the differences in the clock distribution delays of the p_clk and s_clk signals can create substantial uncertainty in the timing relationships between the two clock signals even in a test environment where the signals are ultimately derived from a common clock. If the synchronizer of the present invention is not used then this uncertainty in the timing relationship can create race conditions. The need for the synchronizer of the present invention becomes particularly acute when the uncertainty in the timing relationship between the clock signals is greater than a clock period of the faster clock. This is likely to be the case where there is a large difference in the frequencies of the p_clk and the s_clk. For example, where the CPU s_clk is 300 MHz and the System Bus p_clk is 33 MHz, the higher data sampling rate in the s_clk clock domain could create a high incidence of race conditions if the synchronizer of the present invention is not used to ensure that data is not sampled until after the slower p_clk signals have had ample time to settle. Circuit components of SYNC_A 212 operating in response to the p_clk clock signal are henceforth referred to as being in the p_clk clock domain. Similarly, circuit components of SYNC_A 212 operating in response to the s_clk signal are referred to as being in the s_clk clock domain.

As described above, to ensure that data is stable when it is sampled, the clock enable signal is used to align enabled rising edges of the s_clk clock signal with falling edges of the p_clk signal during system test. In the example illustrated in the FIG. 4 timing diagram, the s_clk signal frequency is twice that of the p_clk signal frequency. The s_clk _en signal is derived from the s_clk signal. Thus the s_clk _en signal rising edge follows the s_clk signal. In the FIG. 4 embodiment the s_clk_en signal is defined so as to make every other s_clk rising edge an enabled rising edge. Therefore, the first enabled s_clk rising edge is the s_clk cycle following the rising edge of the s_clk _en signal, shown at time t2 in FIG. 4. The delay between s_clk rising edges and s_clk _en rising edges is exaggerated in FIG. 4 to make clear which of the s_clk rising edges are enabled. In the FIG. 4 embodiment enabled s_clk rising edges coincide with the falling edges of the p_clk signal. For example, the p_rqst signal is sampled by the AS1 314 flip-flop at time t2. At time t2 the p_rqst signal has had approximately one half of a p_clk period to stabilize on node a_q 332. This provides a large timing buffer to accommodate uncertainty in the timing relationship between the s_clk and p_clk signals.

In operation, a single p_reset pulse resets flip-flop A 312 to a logical low level output. The low output signal then propagates through flip-flops AS1 314, AS2 316 and B 318 to reset the system. In the clock cycle labeled t1 on FIG. 4, a p_rqst signal is received at XOR gate 310. The p_rqst signal pulse initiates the process of synchronizing a bit to transfer data from the System Bus clock domain to the CPU clock domain. After a short propagation delay the p_rqst pulse arrives at node c1 330. The rising p_clk edge at time t3 clocks the p_rqst signal through flip-flop A 312 to the a_q 332 node. The logic inside the synchronizer is level based logic. Thus the signals at nodes a_q 332, as1_q 334, and as2_q 336 are level signals, not pulses. The p_rqst a_q 332 node level change signal is sampled and propagates through to node as1_q 334 at the next enabled rising edge of the s_clk signal which is at time t4. After the p_rqst signal is received at the AS1 314 flip-flop the remainder of the circuit operation is synchronous. The p_rqst signal propagates through flip-flop AS2 316 which outputs the signal to the as2_q 336 node at time t5. Flip-flop B 318 does not have a clock enable input, therefore at the rising edge of the s_clk signal the p_rqst signal propagates through flip-flop B 318 which outputs the signal to node b_q 338 at time t6. As a result XOR gate 320 provides a high output signal from time t5 to time t6. XOR gate 320 thereby converts the level based internal signals to pulse signals at the s_rqst output. The s_rqst signal can then be coupled to a clock enable of a data flip-flop, not shown, which transfers the actual data from the System Bus clock domain to the CPU clock domain.

It is critical to minimize the delay between the flip-flop AS1 314 output and the flip-flop AS2 316 input because in the event that the flip-flop AS1 314 settling time is delayed this may reduce the amount of time that a stable signal is present at the input of flip-flop AS2 316 before the next enabled rising clock edge. To maximize the available set-up time for data at the AS2 316 flip-flop, the propagation delay between the AS1 314 flip-flop output and the AS2 316 flip-flop input should be minimized. Minimizing this delay thus minimizes the probability of a metastable state propagating through flip-flop AS2 316.

In the example where the s_clk is at 300 MHz and the p_clk is at 33 MHz, the ratio of the s_clk _enable frequency to the s_clk frequency would be reduced so that each enabled rising edge of the s_clk is approximately aligned with a falling edge of the p_clk. The present invention can be applied to synchronize data transfer between clock domains operating at any frequency provided that a relationship between the signals can be defined with an uncertainty small enough to ensure that the enabled rising edges of one clock sample data from the other clock domain when the data is stable. In a test environment this relationship is satisfied by deriving the p_clk and s_clk signals from a common clock and ensuring that the variation in clock distribution delay is within a predetermined range.

SYNC_B

Figure 5:
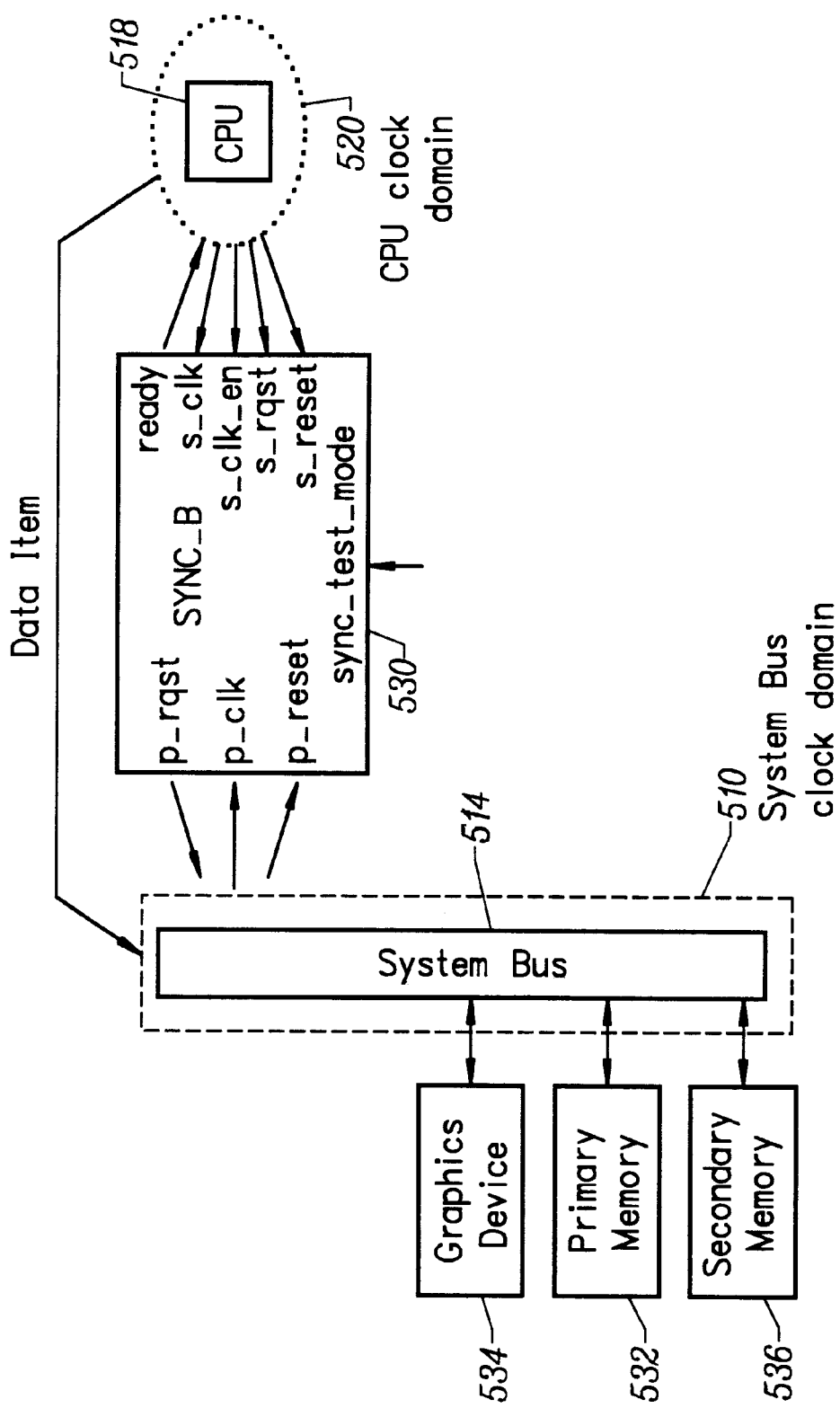
FIG. 5 illustrates a block diagram of a computer system including a synchronizer for transferring data to a clock domain operating at a lower clock frequency according one embodiment of the present invention.

FIG. 5 illustrates a block diagram of a computer system including a synchronizer for transferring data to a clock domain operating at a lower clock frequency according to one embodiment of the present invention. In FIG. 5, the CPU clock domain 520 is the faster clock domain. The System Bus clock domain 510 is the slower clock domain. Similar to SYNC_A 212 a synchronizer bit is transferred through the synchronizer and the data travels in a separate path. In the SYNC_B 530 embodiment CPU 518 in CPU clock domain 520 transfers data to the System Bus clock domain 510. Because of its higher clock frequency, the CPU clock domain 520 can transfer data faster than the System Bus clock domain 510 can receive data. To ensure that the CPU clock domain 520 only transfers data when the System Bus clock domain 510 is ready to receive it a ready signal is provided by SYNC_B 530 to the CPU clock domain 520 to indicate that the System Bus clock domain 510 is ready to receive data. The ready signal originates from a circuit within SYNC_B 530 operating in response to the p_clk clock signal. This signal is then transferred across an asynchronous boundary to ultimately provide the signal to the CPU clock domain 520 operating in response to the s_clk clock signal. The SYNC_B 530 synchronizer is thus a bi-directional synchronizer in that data is transferred from CPU clock domain 520 to System Bus clock domain 510 and a status signal is transferred from the p_clk clock domain to the s_clk clock domain.

Figure 6:
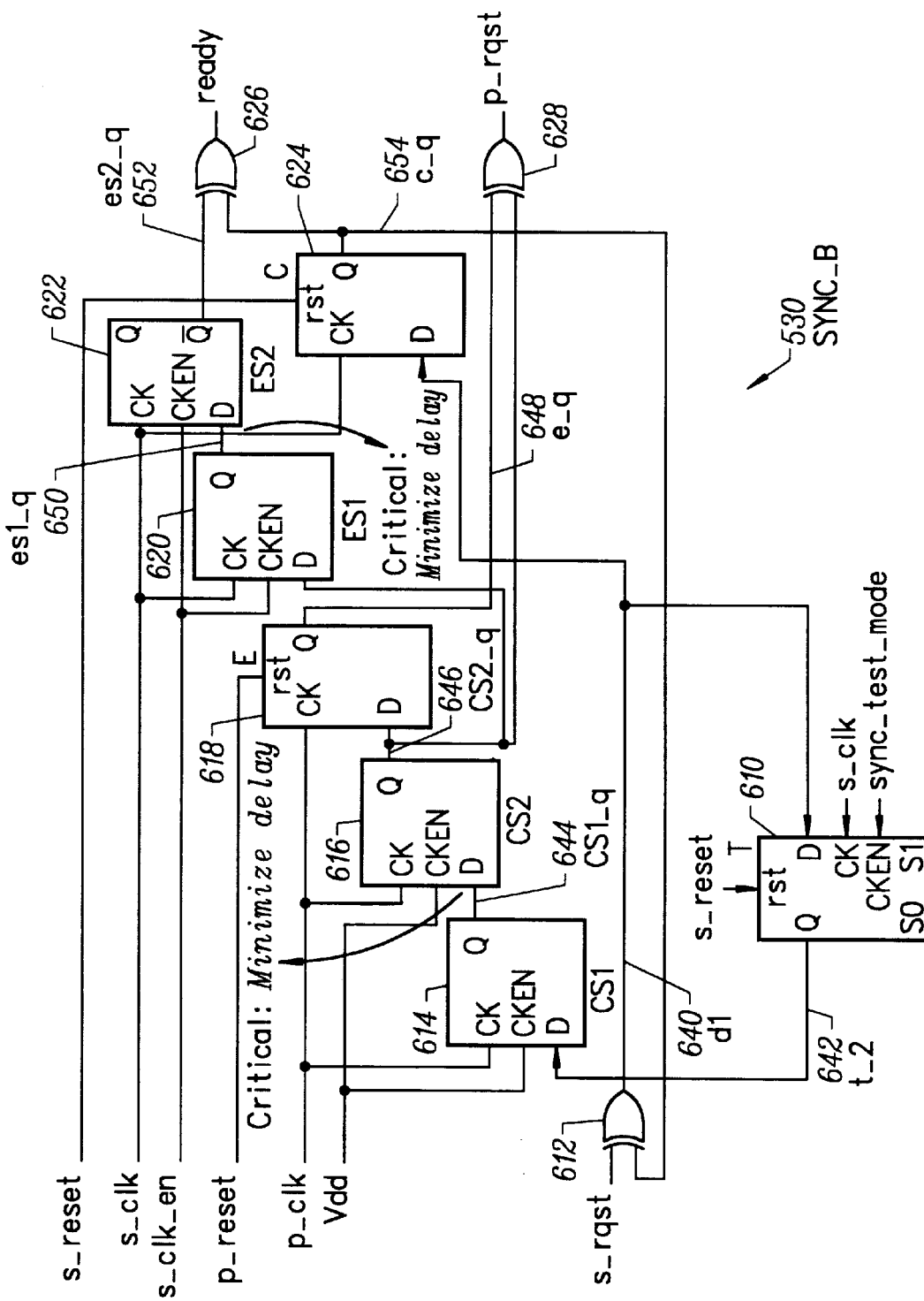
FIG. 6 illustrates a logic diagram of an embodiment of the SYNC_B synchronizer of FIG. 5.

FIG. 6 illustrates a logic diagram of an implementation of the SYNC_B synchronizer illustrated in FIG. 5 for transferring data to a clock domain operating at a lower clock frequency according to one embodiment of the present invention. Because of the bi-directional transfers, there are two asynchronous transitions in the SYNC_B synchronizer. One asynchronous transfer is from flip-flop T 610 in the s_clk clock domain to flip-flop CS1 614 in the p_clk clock domain. The second asynchronous transfer is from flip-flop CS2 616 in the p_clk clock domain to flip-flop ES1 620 in the s_clk clock domain.

The SYNC_B 530 synchronizer includes two signal alignment circuits. The first signal alignment circuit is comprised of flip-flops T 610 and CS1 614. The second signal alignment circuit is comprised of flip-flops CS2 616, ES1 620 and ES2 622. Similar to the SYNC_A212 synchronizer embodiment, SYNC_B 530 has a p_rqst, p_clk, p_reset, s_clk, s_clk_en, and s_rqst terminal. In addition to these common elements, the SYNC_B 510 synchronizer also has new signal terminals sync_test_mode, ready and s_reset. The functions of these signals are described in relation to FIG. 7.

Figure 7:
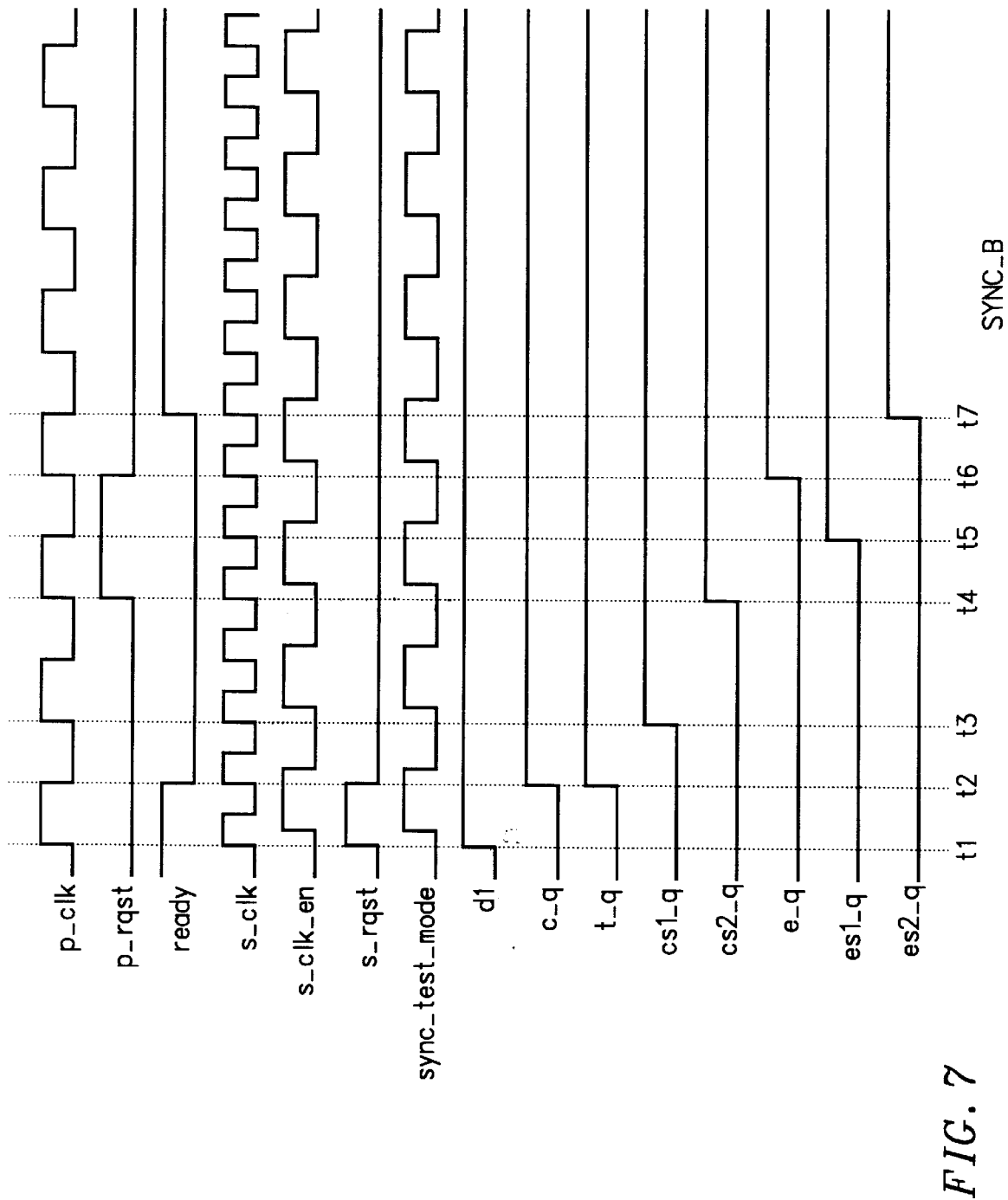
FIG. 7 illustrates a timing diagram for the SYNC_B synchronizer embodiment of FIG. 6.

FIG. 7 illustrates a timing diagram for the SYNC_B 530 synchronizer embodiment of FIG. 6. In operation the s_reset signal at flip-flop T 610 and the p_reset signal at flip-flop E 618 reset the synchronizer when the device is powered up. The reset signals reset the outputs of the flip-flops T 610 and E 618 to a logical low level. Those low level signals are then propagated through to the other flip-flops in synchronizer SYNC_B 530 at subsequent clock cycles. When the device is powered up set-up operations are performed before data is transferred through the synchronizers which provides ample time for the reset signals to propagate through all of the synchronizer flip-flops. With all of the flip-flops reset the Q outputs are at a logical low level and the Q bar output of flip-flop ES2 622 is at a logical high level. The ready signal which is the output of XOR gate 626 is thus high. This indicates to the CPU clock domain 520 that the SYNC_B 530 synchronizer is ready to transfer a data item from the CPU clock domain 520 to the System Bus clock domain 510. The s_rqst rising edge signal at time t1 illustrated in FIG. 7 is a request from the CPU clock domain 520 to transfer a data item. The Q output of flip-flop C 624 is low at time t1; therefore, the output, node d1 640, of XOR gate 612 goes high at time t1. Similar to SYNC_A 212 the logic inside of the SYNC_B 530 synchronizer is level based logic. The signals at the internal nodes of SYNC_B 530 are therefore levels, not pulses. The output stages of SYNC_B 530 convert the level signals into pulses. Node d1 640 provides the s_rqst signal to the D input of flip-flop T 610.

At time t2 the logical high level on node d1 640 is clocked to the output of flip-flop C 624. Both inputs of XOR gate 626 are then high. This causes the ready signal output of XOR gate 626 to go low at time t2 as illustrated in FIG. 7. This indicates to the CPU clock domain 520 that the SYNC_B 530 synchronizer is not available to receive a new synchronizer request.

The logical high level on node d1 640 is also clocked to the output of flip-flop T 610 at time t2. The t_q 642 node between the output of flip-flop T 610 and the input of flip-flop CS 1 614 is a transition between the s_clk clock domain and the p_clk clock domain. As described with regard to SYNC_A 212, transferring data asynchronously across clock domains such as from flip-flop T 610 to CS1 614 is subject to race conditions. In particular it is important to ensure that a rising data edge from T 610 does not arrive at CS1 614 so close to a rising p_clk edge that the set-up time requirement of CS1_614 is violated. Violating the set-up time can create an indeterminate state where the data signal may or may not be received by CS1 614.

In a test environment, to ensure deterministic operation at the asynchronous transition between flip-flops T 610 and CS1 614, a sync_test_mode clock enable signal is provided at T 610. The operation of the T 610 clock enable is similar to the use of the clock enable in SYNC_A 212 to ensure deterministic operation. As illustrated in FIG. 7, the sync_test_mode signal is defined such that enabled s_clk rising edges are aligned with falling p_clk edges. For example, the first enabled s_clk rising edge after the s_rqst signal reaches node d1 640 is at time t2, where FIG. 7 illustrates that the sync_test_mode signal is high at the s_clk rising edge. Because flip-flop T 610 outputs signals at enabled rising s_clk edges, the rising edges of data signals arrive at the D input of flip-flop CS1 614 approximately at a falling edge of the p_clk signal. This provides a one half p_clk period timing window for the data to settle at the p_clk input before CS1 614 samples the data and clocks the data to its output. The clock enable input of flip-flop CS1 614 is coupled to the digital power supply Vdd. Hence, each p-clk rising edge is an enabled rising edge. As with SYNC_A212, in a test environment the p_clk and s_clk signals can be derived from a common clock signal in the test system. Uncertainty in the timing relationship between the two signals is then introduced in part by differences in the clock distribution delays of the clock signal paths. Because of the longer time period of the p_clk clock cycle, compared to the s_clk clock cycle, the one half p_clk period timing window should be sufficiently greater than the uncertainty in the timing relationship between the s_clk and p_clk signals. Satisfying this condition ensures the deterministic operation of the transfer of signals from flip-flop T 610 to flip-flop CS1 614 because it ensures that data at the input of flip-flop CS1 614 has ample time to settle before it is sampled at the next p_clk rising edge.

At time t3, flip-flop CS1 614 outputs the s_rqst signal to node cs1_q. The clock enable of flip-flop CS2 616 is coupled to the digital power supply Vdd. Thus, at time t4 at the first p_clk rising edge after the data is available, flip-flop CS2 616 samples the signal and outputs the signal to node cs2_q 646. The Q output of flip-flop CS2 616 is coupled to the D input of flip-flop E 618, the D input of flip-flop ES1 620, and to one of the inputs of XOR gate 628. The logical high level signal at the cs2__q 646 input of XOR gate 628 causes the p__rqst signal at the XOR gate 628 output to go high at time t4. At time t6 the cs2__q 646 node signal is clocked through to the output, node e__q 648, of flipflop E 618. This output is coupled to the XOR gate 628 input, which causes the p__rqst signal at the XOR gate 628 output to go low at time t6. The p__rqst output pulse is the synchronization bit in the p__clk clock domain that synchronizes the transfer of the data item from the CPU clock domain 520 to the System Bus clock domain 510.

To provide a data flow control signal to CPU clock domain 520 the s__rqst signal is transferred from flip-flop CS2 616, which is in the p__clk clock domain, back to the s__clk clock domain. This asynchronous transfer back to the s__clk clock domain occurs between the CS2 616 flip-flop and the ES1 620 flip-flop. Here again the same clock alignment technique is applied as is used to transfer the s__rqst signal from the s__clk clock domain to the p__clk clock domain. The s__clk__en signal drives the clock enable terminal of flip-flop ES1 620. The __clk__en signal is defined so that the enabled s__clk rising edges are aligned with the falling edges of the p__clk signal. As described above this ensures that data transfer across the time domains is deterministic. At time t7 the enabled s__clk rising edge clocks the s__rqst signal to the Q bar output of flip-flop ES2 622, labeled as node es2__q 652. This output provides a logical low level input to XOR gate 626. The c__q 654 node input of XOR gate 626 is coupled to the output of flip-flop C 624. The c__q 654 node output is high. Therefore at time t7 the ready signal output of XOR gate 626 goes high indicating to CPU clock domain 520 that the synchronizer SYNC__B 530 is ready to receive another s__rqst synchronization bit. The synchronization process is then repeated when the next s__rqst pulse is received.

After the synchronizer device has been tested and placed into a system, such as a computer system, the synchronizer may be operated in an application mode. In a system that can tolerate uncertain delays where data is transferred across an asynchronous boundary, the application mode can be used to minimize system latency. In the application mode the sync__test__mode signal is asserted to a continuous logical high level. Maintaining a high sync__test__mode signal avoids any delays introduced by the clock enable signal. Data at the input of flip-flop T 610 is then sampled at the first s__clk rising edge rather than the first enabled s__clk rising edge, thereby minimizing delay.

Thus an improved synchronizer method and apparatus has been described that ensures deterministic transfer of data across an asynchronous boundary in a test environment, and allows the synchronizer to minimize system latency in an application environment.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use con-templated. It is intended that the scope of the invention be defined by the following Claims and their equivalents.

What is claimed is:

1. A method of synchronizing data comprising the steps of:

receiving a request signal and a first clock signal at an input circuit operating in a first clock domain;

outputting said request signal to a transition circuit operating in a second clock domain responsive to a second clock signal;

accepting a clock enable signal and said second clock signal at said transition circuit; and receiving said request signal at said transition circuit at an enabled rising edge of said second clock signal, wherein said clock enable signal aligns said enabled rising edge of said second clock signal so as to be closer to a falling edge of said first clock signal than to a rising edge of said first clock signal.

2. The method of claim 1 further comprising the step of responding to a reset signal at said input circuit.

3. A synchronizer device comprising:

a first flip-flop, having an input terminal, an output terminal, and a clock terminal;

a second flip-flop, having an input terminal, an output terminal, a clock terminal, and a clock enable terminal, said second flip-flop input terminal coupled to said first flip-flop output terminal;

a third flip-flop, having an input terminal, an output terminal, a clock terminal, and a clock enable terminal, said third flip-flop input terminal coupled to said second flip-flop output terminal, said third flip-flop clock enable terminal coupled to said second flip-flop clock enable terminal; and a fourth flip-flop, having an input terminal, an output terminal, and-a clock terminal, said fourth flip-flop input terminal coupled to said third flip-flop output terminal, said second flip-flop clock terminal coupled to said third and fourth flip-flop clock terminals;

wherein a rising edge of a first clock signal at said first flip-flop clock terminal is separated in time from an enabled rising edge of a second, clock signal at said clock terminals of said second third and fourth flip-flops by an amount greater than an uncertainty value in the timing relationship between said first and second clock signals.

4. The synchronizer device of claim 3 wherein a first enabled rising edge of said second clock signal is aligned so as to be closer to a falling edge of said first clock signal than to a rising edge of said first clock signal.

5. The synchronizer device of claim 4 wherein said first flip-flop further comprises a reset mechanism to reset said first flip-flop.

6. A synchronizer device comprising:

a first signal alignment circuit to align two signals, said first signal alignment circuit having an input terminal, a first clock terminal, a second clock terminal, a first clock enable terminal and an output terminal, wherein said first clock enable terminal and said first clock terminal are in a first clock domain, said second clock terminal is in a second clock domain, a first clock enable signal at said first clock enable terminal aligns a first clock signal at said first clock terminal with a second clock signal at said second clock terminal so that an enabled rising edge of said first clock signal is separated in time from a rising edge of said second clock signal by an amount greater than an uncertainty value in the timing relationship between said first and second clock signals;

a second signal alignment circuit to align two signals, said second signal alignment circuit having an input terminal, a third clock terminal, a fourth clock terminal, a second clock enable terminal, a flow control output terminal, and a first request output terminal, said second signal alignment circuit input terminal coupled to said first signal alignment circuit output terminal, wherein said third clock terminal is in said second clock domain, said fourth clock terminal and said second clock enable terminal are in said first clock domain, a second clock enable signal at said second clock enable terminal aligns a third clock signal at said third clock terminal with a fourth clock signal at said fourth clock terminal so that an enabled rising edge of said fourth clock signal is separated in time from a rising edge of said third clock signal by an amount greater than an uncertainty value in the timing relationship between said third and fourth clock signals; and a status circuit for outputting a ready signal when said synchronizer device is ready to receive a new transfer request, said status circuit having an input terminal and an output terminal, said status circuit input terminal coupled to said second signal alignment circuit flow control output terminal.

7. The synchronizer device of claim 6 wherein said first clock enable signal aligns said first clock signal with said second clock signal so that an enabled rising edge of said first clock signal is closer to a falling edge of said second clock signal than to a rising edge of said second clock signal; and wherein said second clock enable signal aligns said third clock signal with said fourth clock signal so that an enabled rising edge of said fourth clock signal is closer to a falling edge of said third clock signal than to a rising edge of said third clock signal.

8. The synchronizer device of claim 7 wherein said first signal alignment circuit comprises:

a first flip-flop having an input terminal, a clock terminal, a clock enable terminal, and an output terminal, said first flip-flop input terminal coupled to said input terminal of said first signal alignment circuit, said first flip-flop clock terminal coupled to said first clock terminal, said first flip-flop clock enable terminal coupled to said first clock enable terminal;

a second flip-flop having an input terminal, a clock terminal and an output terminal, said second flip-flop input terminal coupled to said first flip-flop output terminal, said second flip-flop clock terminal coupled to said second clock terminal.

9. The synchronizer device of claim 8 wherein said second signal alignment circuit comprises:

a third flip-flop having an input terminal, a clock terminal and an output terminal, said third flip-flop input terminal coupled to said second flip-flop output terminal, said third flip-flop clock terminal coupled to said third clock terminal;

a fourth flip-flop having an input terminal, a clock terminal, a clock enable terminal and an output terminal, said fourth flip-flop input terminal coupled to said third flip-flop output terminal;

a fifth flip-flop having an input terminal, a clock terminal, a clock enable terminal, and an output terminal, said fifth flip-flop input terminal coupled to said fourth flip-flop output terminal, said fourth flip-flop clock terminal and said fifth flip-flop clock terminal coupled to said fourth clock terminal, said fourth flip-flop clock enable terminal and said fifth flip-flop clock enable terminal coupled to said second clock enable terminal.

10. The synchronizer device of claim 9 wherein said first flip-flop further comprises a first reset circuit to reset said first flip-flop; and wherein said second signal alignment output circuit further comprises a second request output terminal, and a sixth flip-flop having an input terminal, an output terminal, a clock terminal and a second reset circuit to reset said sixth flip-flop, said sixth flip-flop input terminal coupled to said third flip-flop output terminal, said sixth flip-flop clock terminal coupled to said third clock terminal, said sixth flip-flop output terminal coupled to said second request output terminal.

11. A method of synchronizing data comprising the steps of:

receiving a request signal and a ready signal;

outputting said request signal when said ready signal is in a predetermined state;

receiving a first clock signal and a first clock enable signal at a first circuit operating in a first clock domain;

receiving said request signal at said first circuit at an enabled rising edge of said first clock signal;

transferring said request signal from said first circuit to a second circuit operating in a second clock domain at an enabled rising edge of said first clock signal, said second clock domain responsive to a second clock signal, wherein said first clock enable signal aligns said enabled rising edges of said first clock signal with said second clock signal so as to be closer to a falling edge of said second clock signal than to a rising edge of said second clock signal;

routing said request signal from said second circuit to a third circuit;

receiving at said third circuit said first clock signal and a second clock enable signal;

receiving said request signal at said third circuit at an enabled rising edge of said first clock signal, wherein said second clock enable signal aligns enabled rising edges of said first clock signal in said third circuit so that said enabled rising edges are closer to a falling edge of said second clock signal than to a rising edge of said second clock signal.

12. The method of claim 11 further comprising the step of asserting said first clock enable signal for a plurality of cycles of said first clock signal.

13. The method of claim 12 further comprising the step of receiving at least one reset signal to reset said first, second and third circuits.

14. The method of claim 13 wherein said first, second and third circuits are comprised of flip-flops.

15. A computer system comprising:

a processor;

a synchronizer, said synchronizer coupled to said processor, said synchronizer having a first signal alignment circuit to align two signals, said first signal alignment circuit having an input terminal, a first clock terminal, a second clock terminal, a first clock enable terminal and an output terminal, wherein said first clock enable terminal and said first clock terminal are in a first clock domain, said second clock terminal is in a second clock domain, a first clock enable signal at said first clock enable terminal aligns a first clock signal at said first clock terminal with a second clock signal at said second clock terminal so that an enabled rising edge of said first clock signal is separated in time from a rising edge of said second clock signal by an amount greater than an uncertainty value in the timing relationships between said first and second clock signals;

a second signal alignment circuit to align two signals, said second signal alignment circuit having an input terminal, a third clock terminal, a fourth clock terminal, a second clock enable terminal, a flow control output terminal, and a first request output terminal, said second signal alignment circuit input terminal coupled to said first signal alignment circuit output terminal, wherein said third clock terminal is in said second clock domain, said fourth clock terminal and said second clock enable terminal are in said first clock domain, a second clock enable signal at said second clock enable terminal aligns a third clock signal at said third clock terminal with a fourth clock signal at said fourth clock terminal so that an enabled rising edge of said fourth clock signal is separated in time from a rising edge of said third clock signal by an amount greater than an uncertainty value in the timing relationship between said third and fourth clock signals; and a status circuit for outputting a ready signal when said synchronizer is ready to receive a new transfer request, said status circuit having an input terminal and an output terminal, said status circuit input terminal coupled to said second signal alignment circuit flow control output terminal.

16. The computer system of claim 15 wherein said first clock enable signal aligns said first clock signal with said second clock signal so that an enabled rising edge of said first clock signal is closer to a falling edge of said second clock signal than to a rising edge of said second clock signal; and wherein said second clock enable signal aligns said third clock signal with said fourth clock signal so that an enabled rising edge of said fourth clock signal is closer to a falling edge of said third clock signal than to a rising edge of said third clock signal.

17. The computer system of claim 16 wherein said first signal alignment circuit comprises:

a first flip-flop having an input terminal, a clock terminal, a clock enable terminal, and an output terminal, said first flip-flop input terminal coupled to said input terminal of said first signal alignment circuit, said first flip-flop clock terminal coupled to said first clock terminal, said first flip-flop clock enable terminal coupled to said first clock enable terminal;

a second flip-flop having an input terminal, a clock terminal and an output terminal, said second flip-flop input terminal coupled to said first flip-flop output terminal, said second flip-flop clock terminal coupled to said second clock terminal.

18. The computer system of claim 17 wherein said second signal alignment circuit comprises:

a third flip-flop having an input terminal, a clock terminal and an output terminal, said third flip-flop input terminal coupled to said second flip-flop output terminal, said third flip-flop clock terminal coupled to said third clock terminal;

a fourth flip-flop having an input terminal, a clock terminal, a clock enable terminal and an output terminal, said fourth flip-flop input terminal coupled to said third flip-flop output terminal;

a fifth flip-flop having an input terminal, a clock terminal, a clock enable terminal, and an output terminal, said fifth flip-flop input terminal coupled to said fourth flip-flop output terminal, said fourth flip-flop clock terminal and said fifth flip-flop clock terminal coupled to said fourth clock terminal, said fourth flip-flop clock enable terminal and said fifth flip-flop clock enable terminal coupled to said second clock enable terminal.

19. The computer system of claim 18 wherein said first flip-flop further comprises a first reset circuit to reset said first flip-flop; and wherein said second signal alignment output circuit further comprises a second request output terminal, and a sixth flip-flop having an input terminal, an output terminal, a clock terminal and a second reset circuit to reset said sixth flip-flop, said sixth flip-flop input terminal coupled to said third flip-flop output terminal, said sixth flip-flop clock terminal coupled to said third clock terminal, said sixth flip-flop output terminal coupled to said second request output terminal.

* * * * *